(12) United States Patent
Mialhe et al.

(10) Patent No.: US 9,776,703 B2
(45) Date of Patent: Oct. 3, 2017

(54) AIRCRAFT FUSELAGE STIFFENER FORMED FROM A SHEET FOLDED OVER ONTO ITSELF

(71) Applicant: Airbus Operations (S.A.S.), Toulouse Cedex (FR)

(72) Inventors: Christophe Mialhe, Giroussens (FR); Patrick Lieven, Fronton (FR); Philippe Rodrigo, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/742,167

(22) Filed: Jun. 17, 2015

(65) Prior Publication Data

US 2015/0367929 A1 Dec. 24, 2015

Related U.S. Application Data

(63) Continuation of application No. PCT/FR2013/053194, filed on Dec. 19, 2013.

(30) Foreign Application Priority Data

Dec. 21, 2012 (FR) ...................................... 12 62656

(51) Int. Cl.
*B64C 1/06* (2006.01)

(52) U.S. Cl.
CPC ................ *B64C 1/06* (2013.01); *B64C 1/061* (2013.01); *B64C 1/064* (2013.01)

(58) Field of Classification Search
CPC B64C 1/06; B64C 1/061; B64C 1/064; B64C 3/18; B64C 3/182; B64C 3/185; E04C 3/07

See application file for complete search history.

(56) References Cited

U.S. PATENT DOCUMENTS 693,560 A * 2/1902 Molloy ..................... E04C 3/07
52/834
3,623,203 A 11/1971 Henshaw et al.
(Continued)

FOREIGN PATENT DOCUMENTS

DE 10 2006 051462 A1 5/2008
EP 0 469 909 A1 2/1992
(Continued)

OTHER PUBLICATIONS

International Search Report and Written Opinion for Application No. PCT/FR2013/053194 dated May 23, 2014.

*Primary Examiner* — Nicholas McFall
(74) *Attorney, Agent, or Firm* — Jenkins, Wilson, Taylor & Hunt, P.A.

(57) ABSTRACT

The disclosure herein relates to an aircraft fuselage stiffener including a heel, a flange, and a web connecting the heel and the flange, this stiffener comprising a folded sheet extending along the length of the heel, the web and the flange. In addition, to improve the mechanical behavior of the stiffener, the folded sheet includes on the one hand a main portion extending along the length of the heel, the web and the flange, and on the other hand at least one folded-over portion forming a lining of the main portion over at least part of the web and/or the heel and/or the flange.

18 Claims, 6 Drawing Sheets

(56) References Cited

U.S. PATENT DOCUMENTS

| | | | |
|---|---|---|---|
| 6,115,986 A * | 9/2000 | Kelly | E04C 3/07 52/481.1 |
| 6,595,467 B2 | 7/2003 | Schmidt | |
| 8,556,213 B2 | 10/2013 | Markowski et al. | |
| 8,628,041 B2 | 1/2014 | Mialhe et al. | |
| 2012/0234979 A1 * | 9/2012 | Smith | B64C 1/40 244/158.1 |

FOREIGN PATENT DOCUMENTS

| | | |
|---|---|---|
| EP | 1 166 950 A2 | 1/2002 |
| EP | 2 404 824 A2 | 1/2012 |
| FR | 2 084 520 A5 | 12/1971 |
| FR | 2 681 933 A1 | 4/1993 |
| FR | 2 920 743 A1 | 3/2009 |

* cited by examiner

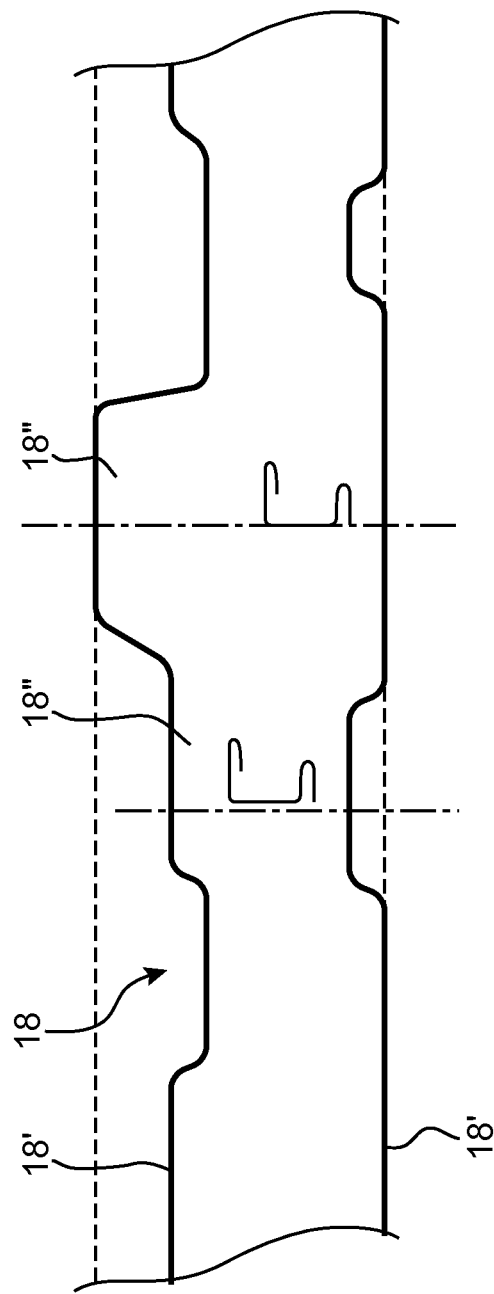

AIRCRAFT FUSELAGE STIFFENER FORMED FROM A SHEET FOLDED OVER ONTO ITSELF

CROSS-REFERENCE TO RELATED APPLICATIONS

This application is a continuation of and claims priority to PCT/FR2013/053194 filed Dec. 19, 2013, which claims the benefit of and priority to French Patent Application No. 12 62656 filed Dec. 21, 2012, the entire disclosures of which are herein incorporated by reference.

TECHNICAL FIELD

The present disclosure relates to the field of aircraft fuselages, and in particular to that of the stiffeners thereof.

The disclosure herein applies more particularly, but not exclusively, to the field of commercial airplanes.

BACKGROUND

Airplane fuselages normally comprise a skin, of which the outer surface forms the aerodynamic surface of the airplane. On the inner surface it is normally provided with a plurality of stiffeners. These can be transverse stiffeners, in particular frames forming the barrel of the fuselage (either complete frames or frames that are interrupted, for example by the landing gear), or longitudinal stiffeners, such as stringers or longerons, or also other ribs.

The stiffeners thus have a curvature matching the shape of the skin and can be formed from a plurality of stiffener lengths assembled end-to-end. They are intended to provide the fuselage with an increased mechanical strength, which is reinforced by the presence of longitudinal stringers fixed to the skin and to the stiffeners, these stringers also being obtainable by assembly of lengths end-to-end. Such a fuselage is known for example from document FR 2 920 743 A1.

The stiffeners in question here have a flange intended to be fixed to the fuselage skin, and also a heel connected to the flange by a web. They can be formed by different techniques, such as the folding and the shaping of a sheet, the machining of a thick plate, or also the shaping of a profile obtained by spinning. Although these solutions are satisfactory, the ever-increasing certification requirements result in a need to find solutions that reinforce the mechanical strength of these stiffeners whilst controlling the costs.

SUMMARY

An object of the disclosure herein is therefore to overcome at least in part the above-mentioned disadvantages relating to the embodiments of the prior art.

To do this the disclosure herein firstly relates to an aircraft fuselage stiffener comprising a heel, a flange, and a web connecting the heel and the flange, the stiffener comprising a folded sheet extending along the length of the heel, the web, and the flange. In accordance with the disclosure herein the folded sheet comprises, on the one hand, a main portion extending along the length of the heel, the web, and the flange, and, on the other hand, at least one folded-over portion forming a lining of the main portion over at least part of the web and/or the heel and/or the flange.

The disclosure herein is noteworthy in that it provides, by simple folding of the sheet, one or more zones with a multiple sheet thickness. This certainly reinforces the mechanical strength of the stiffener at the desired locations, without significantly affecting the production costs. In fact, the used folded sheet can maintain a thickness approximately equal to that used previously for the folded sheet solutions, in which the sheet was not folded over onto itself over all or part thereof. Equipment similar to that used previously can consequently be used, which helps to achieve good cost management.

The disclosure herein preferably has at least one of the following additional features, possibly taken in combination.

The folded-over portion forming a lining extends over at least part of the heel.

At least part of the folded-over portion forming a lining rests on the main portion, in direct or indirect contact, for example with interposed mastic arranged between the two portions resting against one another.

At least part of the web and/or heel and/or flange has a thickness that is variable along the length of the stiffener.

The variation of the thickness is provided by varying the spacing of the main portion and folded-over portion and/or by varying the number of folded-over portions overlapping one another.

The web, the heel, and/or the flange has/have a width that is variable along the length of the stiffener.

At least at one of the elements among the web, the heel, and the flange, the main portion of the folded sheet is doubled by the folded-over portion along an overlap width that is variable along the length of the stiffener.

The main portion and the folded-over portion forming a lining delimit therebetween at least one cavity, preferably filled at least in part by a reinforcement element, for example an extruded profile, a part made of composite material, etc. This makes it possible to obtain reinforced zones, the choice of placement thereof being determined in accordance with the needs in terms of static grip, fatigue, tolerance to damage, propagation of faults, etc. The cavity provides an increased section modulus of the zone in question, of which the strength can then be increased thanks to the presence of the reinforcement elements, which are preferably fixed to the main portion and/or the portion forming a lining of the folded sheet with the aid of conventional structure such as for example glue, rivets, bolts, a solder, etc.

Each reinforcement element is fixed to the main portion and/or to the folded-over portion.

The folded-over portion forming a lining extends along the length of at least a portion of the web, with the aid of a web lining element.

The web lining element defines, in cross section of the stiffener, a mechanical reinforcement edging, through-openings preferably being arranged between the reinforcement edging and the flange and opening out at the flange. This edging, projecting preferably orthogonally to the web, can advantageously reinforce the mechanical strength of the stiffener. The edging preferably has, in section, a quadrilateral shape, for example square or rectangular, possibly with rounded corners.

In the case of fuselage stiffeners, openings are intended for the passage of the stringers of the fuselage. Each opening thus has a base, which is arranged preferably in proximity of the edging, without passing therethrough. This edging also marks the limit of the working section of the stiffener, this working section, also referred to as the standard section, extending as far as the end of the stiffener formed by the heel.

The mechanical reinforcement edging defines a cavity, preferably filled at least in part by a reinforcement element.

In cross section the stiffener has a general C shape or Z shape, with the central branch formed by the web preferably substantially perpendicular to the two end branches formed by the heel and the flange.

The stiffener preferably forms all or part of a fuselage frame or a longitudinal stringer.

The disclosure herein also relates to an aircraft fuselage comprising at least one such stiffener. It preferably comprises a fuselage skin and longitudinal stringers fixed to the skin, the stringers passing through the openings provided on the fuselage stiffeners.

The disclosure herein also relates to an aircraft comprising such a fuselage.

Lastly, the disclosure herein also relates to a method for producing such a stiffener, comprising a step of folding of the sheet so as to obtain on the one hand the general shape of the stiffener and so as to obtain on the other hand the portion folded over on the main portion of the sheet.

Further advantages and features of the disclosure herein will become clear from the non-limiting detailed description below.

BRIEF DESCRIPTION OF THE DRAWINGS

This description is provided with reference to the accompanying drawings, in which:

FIG. 15 shows a top view of a sheet having irregular edges making it possible to obtain a stiffener of changing section.

DETAILED DESCRIPTION

Figure 1:
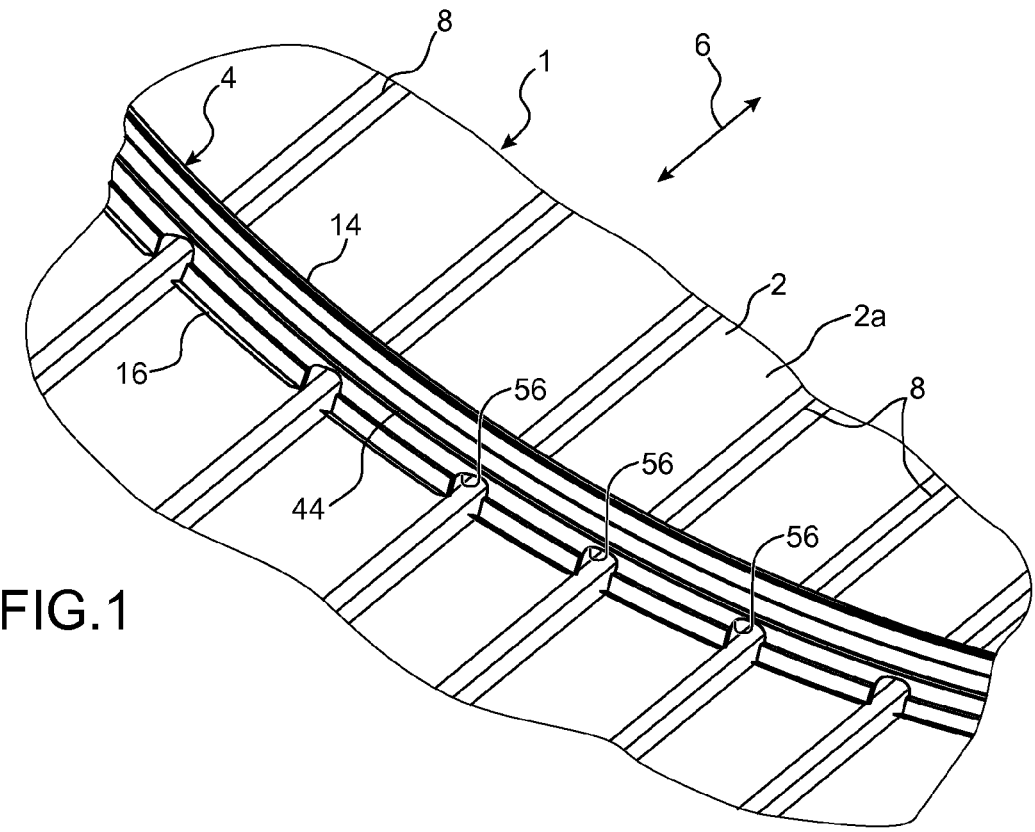
FIG. 1 shows a perspective view of part of an aircraft fuselage in accordance with a preferred embodiment of the disclosure herein.

With reference firstly to FIG. 1, a commercial airplane fuselage in accordance with a preferred embodiment of the disclosure herein is shown in part, as viewed from inside the aircraft.

Conventionally, the fuselage 1 comprises a skin 2 of which the inner surface 2a fixedly carries fuselage stiffeners 4, of which a single one has been shown in FIG. 1. This stiffener 4 extends over all or part of the periphery of the fuselage, in a transverse plane of the aircraft, i.e. a plane orthogonal to the direction 6 corresponding to the longitudinal and axial direction of the airplane. Each stiffener 4 can be provided in one piece or can be formed with the aid of a plurality of stiffener elements/lengths each forming just a single angular sector of the stiffener 4, these elements then being assembled end to end. A stiffener element typically extends over an angular sector of approximately 30 to 120°. For convenience, in the description hereinafter, the stiffener element visible in FIG. 1 and in the following figures will be referred to as the "stiffener 4". It is noted, however, that the other stiffener elements forming the stiffener 4 have a design that is identical or similar to that which will be presented below and that is unique to the present disclosure.

In addition, the fuselage 1 comprises a plurality of longitudinal stringers, which are stiffeners, taking the form of reinforcements passing through the openings in the stiffeners 4. All the stringers 8 extending along the longitudinal direction 6 are fixed to the inner surface 2a of the skin by conventional structure, such as rivets. The same is true for the radially outer end of the frame 4, which is fixed on the same inner surface 2a of the skin along the entire length of the frame. In addition, although not shown, the fuselage comprises other fixing elements, such as stabilizers connecting the stringers to the fuselage stiffeners 4.

It is noted that the particular design of the stiffeners 4 which will be described hereinafter can be applied to the stringers and also to any other stiffener of the fuselage, such as ribs.

One of the particular features of the present disclosure thus lies in the design of the stiffener 4, which will now be detailed with reference to FIG. 2 corresponding to a cross section of stiffener 4, i.e. a section passing through a plane parallel to the longitudinal direction 6 of the airplane.

The stiffener 4 is formed from a folded sheet, which here has the particular feature of being folded over onto itself such that each portion of the stiffener 4 has two sheet thicknesses. More precisely, in this preferred embodiment, the stiffener 4 has a constant section along the entire length thereof, except at the passages of the stringers, which require a removal of material, preferably obtained by machining. A changing section is alternatively conceivable, as will be described hereinafter.

Figure 2:
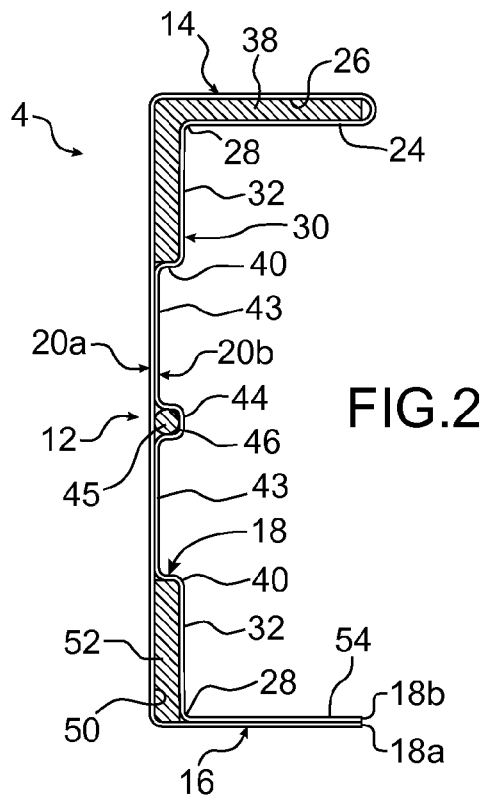
FIG. 2 shows a cross-sectional view of the fuselage stiffener shown in FIG. 1.

In the sections outside these stringer openings, as is shown in FIG. 2, the stiffener 4 comprises a web 12, which is the central vertical portion shown in FIG. 2, at the end of which the heel 14 is located, and at the other end of which the flange 16 is located. Conventionally, on a fuselage stiffener, the web connecting the heel and the flange is apparent at the central portion of the stiffener, whereas the flange is intended to be fixed to another part of the fuselage, normally the skin thereof. The flange, also referred to as a baseplate, is fixed by conventional structure, such as rivets or bolts. The heel, for its part, constitutes the free end of the stiffener, opposite the end formed by the flange.

In the shown embodiment, the section has a general "C" shape with the web 12 substantially perpendicular to the heel 14 and to the flange 16, forming, respectively, the opposite ends of the stiffener 4. Nevertheless, angles different from 90° can be chosen for certain stiffeners 4, in particular for those located at the nose and at the rear of the aircraft. Moreover, this inclination of the flanges and/or of the heels may vary along the length of the stiffeners. Other general section shapes are possible, however, for example in the shape of I, Ω, etc. Hollow sections are also conceivable, without departing from the scope of the disclosure herein.

Along the entire length of the section of the stiffener 4, this thus has two portions overlapping one another and formed from the same folded sheet, identified by general reference 18. More precisely, the sheet 18 has a main portion 20a, which here constitutes the exterior of the C, as well as a folded-over portion 20b forming an inner lining of the main portion. These two portions 20a, 20b are formed from the same sheet folded by appropriate structure and thus having two ends 18a, 18b, which are plated against one another and are substantially coincident at the flange 16, at the free end of the branch of the C formed by this portion 16.

If the main portion 20a has three straight segments forming the C, the portion forming the lining 20b for its part has a more complex shape. Firstly, at the heel 14, the lining 20b comprises a heel lining element 24, which extends at a distance from the element opposite the main portion 20a so as to form therebetween a cavity or space referenced 26. The heel lining element 24 extends in the form of a straight segments between the free end of the C and the opposite end of the heel 14. The lining 20b then has a fold substantially at right angles 28, from which a web lining element 30 extends. In the vicinity of the fold 28, this element 30 firstly comprises a portion 32 in the form of a straight segment arranged at a distance from its corresponding portion of the main portion 20a.

Thus, between the lining elements 24, 32 on the one hand and the upper part of the main portion 20a of the sheet on the other hand, a cavity 26 is formed, which is filled at least in part, and preferably completely, by a reinforcement element 38. This element 38 takes the form of a recumbent and inverted L, and is formed by a profile obtained by extrusion, or also obtained with the aid of an element made of composite material. One solution for filling the cavity with a material of the mastic type is also conceivable, without departing form the scope of the disclosure herein. Of course, this reinforcement element 38 has the same general curvature as that of the different elements of the sheet along the inner surface of the fuselage skin. It is noted that the reinforcement 38 may alternatively be metallic, similarly to the folded sheet 18, which is preferably formed with the aid of an aluminium alloy conducive to the folding thereof. In addition, it is noted that the sheet preferably has a thickness between 0.5 and 3 mm, as well as a width between 5 and 40 mm. In this regard it is noted that the sheet 18 could have a thickness that is variable in the direction of the length thereof, also corresponding to the direction of the length of the stiffener, and/or in the direction of the width thereof. Likewise, the width of the sheet 18 could change along the length thereof. In addition, the parent sheet 18 used to form the same fuselage stiffener could be an assembly of sheets of different materials, and/or of sheets of different thicknesses, and/or of sheets of different widths and/or lengths. In such a configuration in which the initial sheet, which is preferably planar, is obtained by the assembly of different lengths, the fixing end-to-end is implemented, for example, by linear friction, by friction stir welding, or any other conventional technique.

The web lining element 30 then defines a step/a drop 40 making it possible to move closer to the main portion 20a until resting thereon and in contact therewith. This is then a part 43 of the element 30 that is parallel to and in contact with the main portion 20a, preferably fixed thereto by conventional fixing structure or means, such as for example rivets, glue, or also bolts or a solder. An interposed mastic can be applied between the part 43 and the main portion 20a.

In the continuity of the portion 43, the element 30 defines, still in cross section as shown in FIG. 2, a mechanical reinforcement edging 44. This edging has a shape akin to that of a quadrilateral, preferably square or rectangular, with rounded corners. The shape of the cavity 46 is provided by a fold forming a U. The opening of the U is closed by the main portion 20a opposite, and, here as well, a reinforcement element 45 identical or similar to that mentioned above can be provided to fill the cavity 46.

Then, the web lining element 30 continues with a new portion 43 plated and resting against the main portion 20a of the sheet, still being preferably fixed thereto. In the vicinity of the lower end of the web, the lining element 30 again defines a step 40 moving away from the main portion 20a and defining a last part 32 passing at a distance from and parallel to this main portion 20a. A cavity 50 filled by a reinforcement element identical or similar to those mentioned above, and referenced 52 in FIG. 2, is formed between these two elements. In contrast to the reinforcement element 38, the element 52 is present here in the form of a strip without return, since at the low end of the web lining element there is provided a new fold 28, which is also preferably approximately 90°. This fold 28 allows a flange lining element 54 to rest on and be in contact with the branch of the C formed by the main portion 20a. Here again, fixing structure can be provided between these elements opposite and in contact with one another, just as fixing structure can be provided for the reinforcement elements 38, 45, 52 in the cavities 26, 46, 50, in one and/or the other of the main portion 20a and portion forming a lining 20b.

Returning to FIG. 1, it is shown that the stiffener 4 has openings 56 passing through the stiffener 4, these openings being arranged between the reinforcement edging 44 and the flange 16 forming the radial outer edge of the stiffener 4. Each opening 56 also leads out at this end 16 and has a base that is located below the edging 44, in close proximity thereto. Consequently, the part of the stiffener 4 delimited by the edging 44 and the heel 14 constitutes the working part of the stiffener 4.

The solution of folding of the sheet 18 to obtain both the doubling of the thickness thereof and the edging 44 delimiting the working section along the entire length of the stiffener 4 constitutes one of the particular features of the present disclosure.

FIGS. 3 to 7 show further conceivable embodiments.

Figure 3:
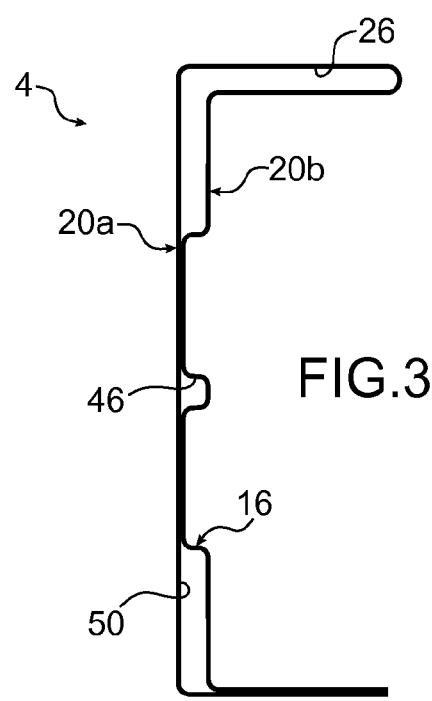
FIGS. 3 to 9 show views similar to that of FIG. 2, in accordance with other conceivable embodiments.

In FIG. 3, the folded sheet 18 has the same shape as in the embodiment of FIG. 2, but the different cavities 26, 46 and 50 that it defines are left empty.

Figure 4:
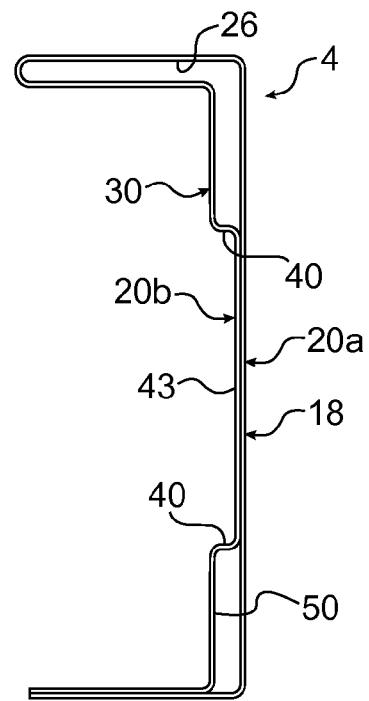

In FIG. 4 the central part of the web lining element 30 no longer has two plated portions 43, between which the edging 44 is formed as in the embodiment of FIG. 2, but instead a single straight portion 43 devoid of edging and connecting the two steps 40 by being plated against the main portion 20a. Here, the cavities 26 and 50 may or may not be filled.

Figure 5:
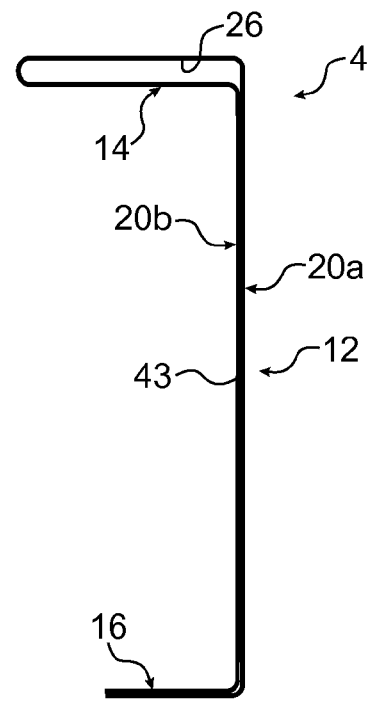

In the embodiment of FIG. 5 the portion forming a lining 20b is modified so as to allow a cavity 26 to remain only at the heel 14, wherein this cavity may or may not be filled. Beyond this cavity 26, the lining 20b is in contact with and rested on the main portion 20a over the rest of the section. Alternatively the lining 20b can extend solely at the heel 14, the parts constituted by the web 12 and flange 16 then being defined only by the single thickness of the main portion 20a.

Figure 6:
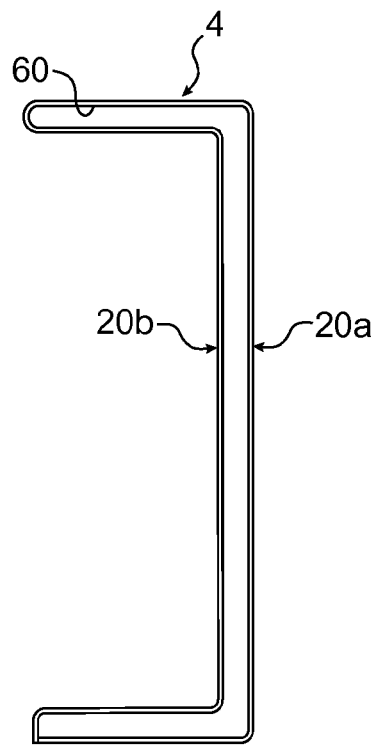

In the embodiment of FIG. 6 the portions 20a and 20b are homothetic and arranged at a distance from one another so as to form a continuous cavity 60 along the entire length of the section. This cavity 60 thus has a C shape similar to that of the two portions 20a and 20b.

Figure 7:
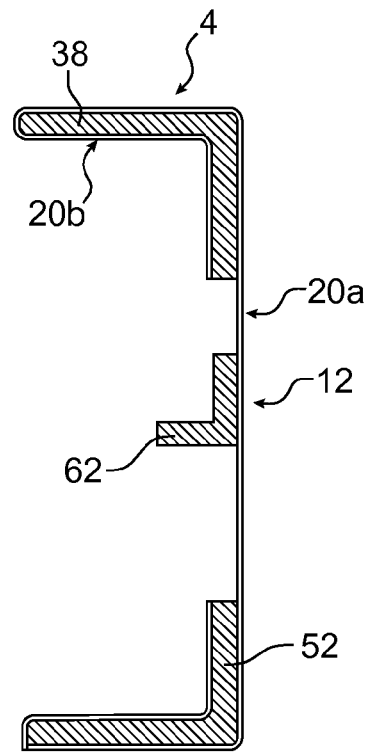

In FIG. 7 the shown embodiment integrates the two reinforcements 38 and 52 of the embodiment of FIG. 2. Nevertheless, the lining 20b extends only partially along the main portion 20a, solely to overlap the two reinforcements 38, 52. In the centre of the web 12 a reinforcement 62 forming an edging may possibly be fixed directly to the main portion 20a, without being overlapped by the lining 20b.

This reinforcement 62 then replaces the edging 44 obtained by folding in the embodiments of FIGS. 2 and 3.

Figure 8:
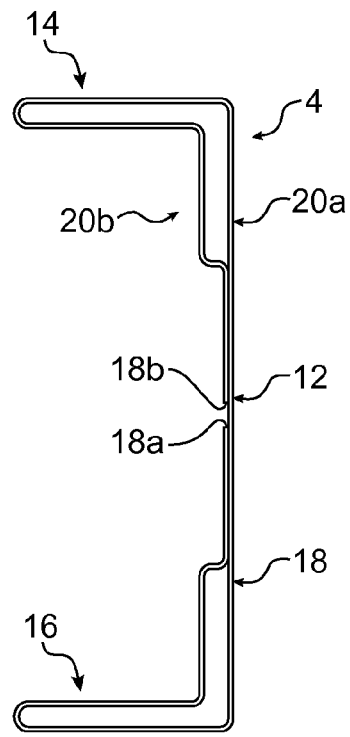

FIG. 8 shows an embodiment substantially identical to that of FIG. 4, with the ends of the sheet 18a, 18b, which no longer join at the flange 16, but at another location such as the central part of the web, within the folded-over portion 20b.

Figure 9:
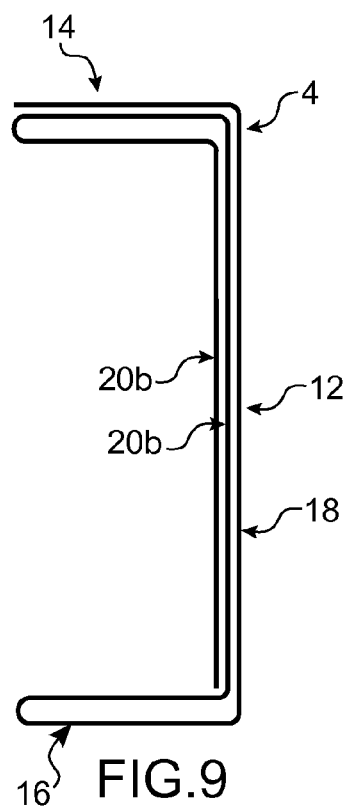

FIG. 9 in turn shows that the number of folded-over portions forming a lining 20b can be greater than two, and each portion extends over all or part of the web, the flange and the heel. In the shown embodiment the heel 14 has three sheet thicknesses, as does the web 12, whereas the flange 16 has only two sheet thicknesses.

Figure 10:
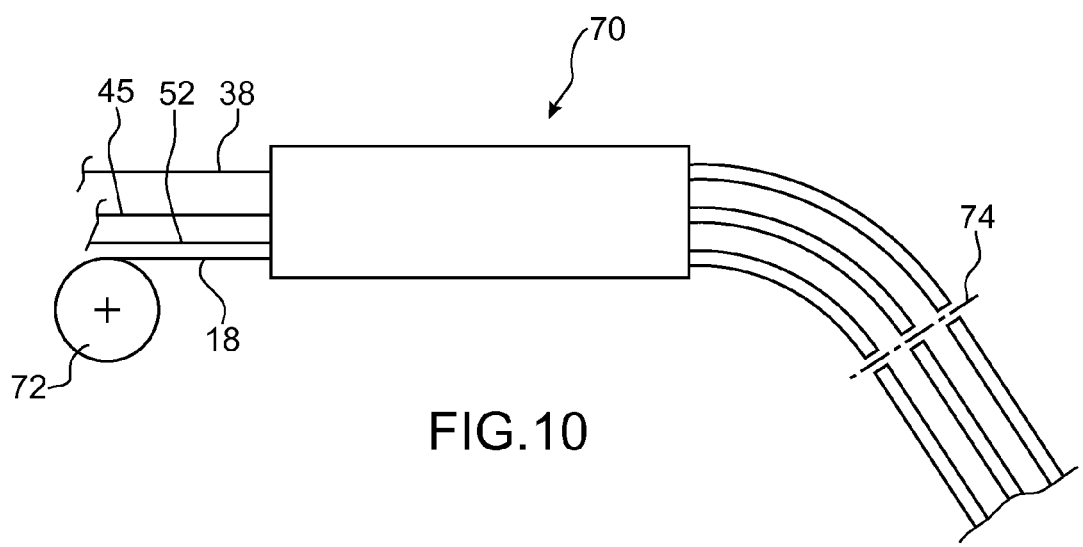
FIG. 10 is a schematic view of a set of equipment for carrying out a method for producing the stiffener shown in FIG. 2.

FIG. 10 schematically shows a set of equipment 70 for carrying out a method for producing the stiffener 4 shown in FIG. 2, but which of course can be used to produce the series of embodiments described above. This set of equipment 70 is constituted by a sheet folding machine, which is fed on the one hand with the raw sheet 18 in the form of a reel 72, and on the other hand with the reinforcements 38, 45, 52. The machine 70 makes it possible to obtain the desired folds in order to obtain the section shown in FIG. 2, with the reinforcements integrated in the respective cavities thereof. The folds are preferably made in accordance with the known technique referred to as cold profiling.

In particular the folding process is carried out such that the lining 20b overlaps the main portion of this sheet along the entire length of the stiffener 4. Here, prior to its introduction into the equipment 70, the sheet 18 is unwound from the reel so as to have a substantially planar form, and, more generally, has a straight section orthogonal to the direction of transport thereof.

In addition the folds are made for example at the same time as the shaping of the stiffeners 4 to the profile of the fuselage, or this shaping is obtained later. The folds make it possible to obtain on the one hand the general shape of the stiffener 4, here a C, and on the other hand to obtain the folded-over part or parts on the main portion. These two groups of folding operations are performed simultaneously or successively, in the order considered to be most appropriate.

In any case, at the output of the machine 70, cuts 74 are provided that make it possible to obtain the stiffeners 4 in accordance with the desired length. Machining operations are then provided to obtain openings for stringers.

Figure 11A:
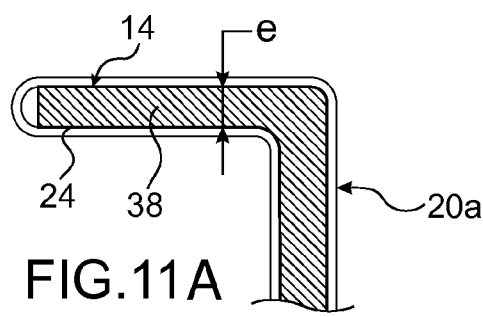
FIGS. 11A to 11C show another exemplary embodiment in which the thickness of the heel of the stiffener changes along the length of the stiffener.
Figure 11B:
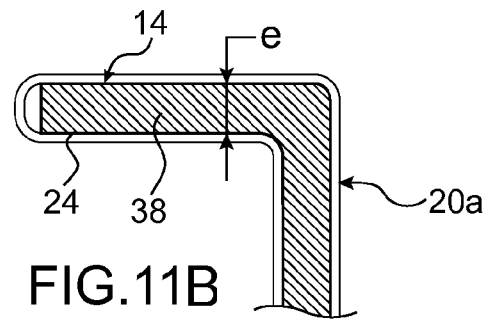
Figure 11C:
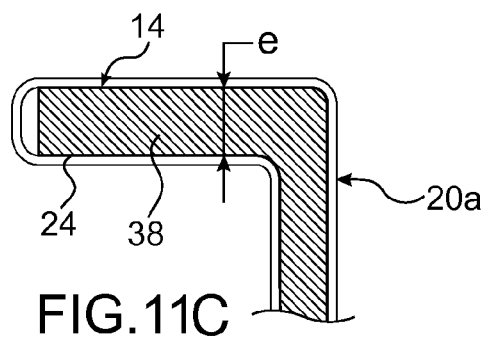

With reference now to FIGS. 11A to 11C, an embodiment in which the stiffener 4 does not have a constant sectional shape along the stiffener 4 is shown, the thickness of one or more parts thereof being variable. FIGS. 11A to 11C correspond, for example, to three cross-sections considered successively along the length of stiffener 4, preferably spaced apart from one another. The variation of the thickness "e", viewed here on the heel 14, is provided by varying the spacing of the main portion 20a and the heel lining element 24. The thickness of the reinforcement element 38 is also preferably adapted consequently.

Figure 12A:
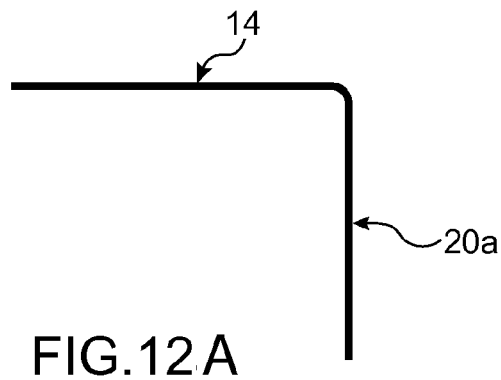
FIGS. 12A to 12C show another exemplary embodiment in which the thickness of the heel of the stiffener changes along the length of the stiffener.
Figure 12B:
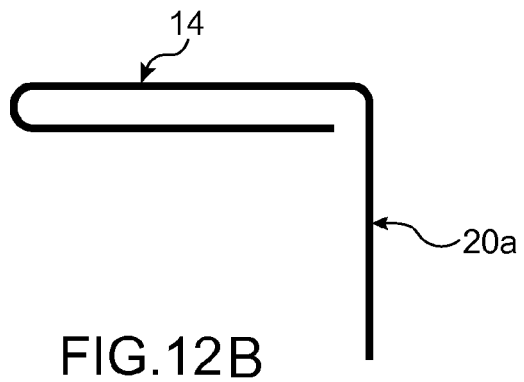
Figure 12C:
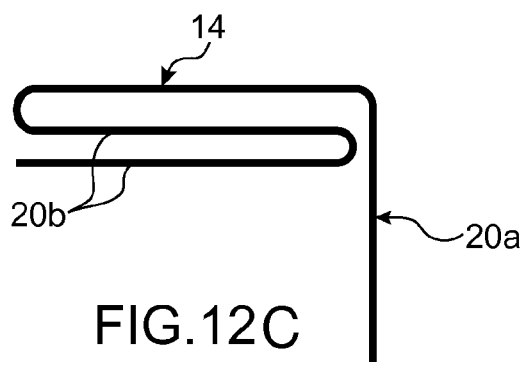
Figure 14A:
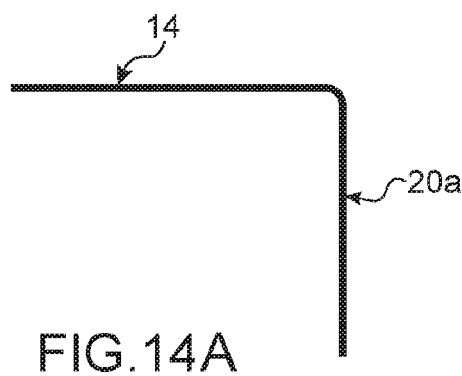
FIGS. 14A to 14C show another exemplary embodiment in which, at the heel of the stiffener, the extent of overlap between the main portion and the folded-over portion changes along the length of the stiffener.
Figure 14B:
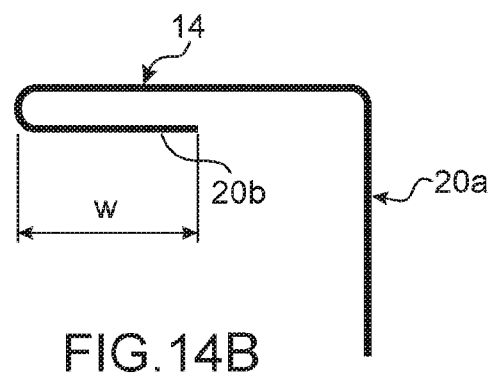
Figure 14C:
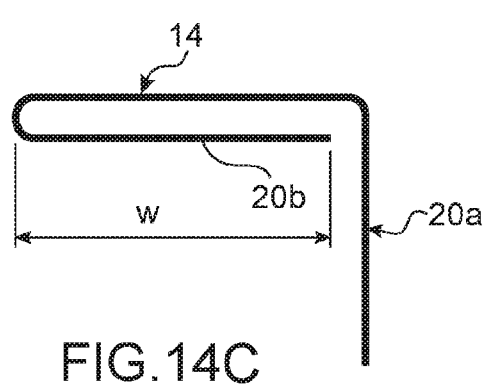

Another way of varying the thickness "e" lies in varying the number of sheet thicknesses by providing a number of changing folded-over portions 20b. This number passes successively from zero to two by way of example in FIGS. 12A to 12C. The change to a number of greater or lower sheet thicknesses can be made without transition, or with transition as is shown in FIGS. 14A to 14C. In these figures it is in fact possible to see that the main portion 20a of the folded sheet is doubled by the folded-over portion 20b along an overlap width "w" that is variable along the length of the stiffener. Here, this width "w" varies between zero (see FIG. 14A) and the total width of the heel 14 (see FIG. 14C). The variation of this width "w" along the length of stiffener 4 can be progressive or without transition. In fact, the variation of this width "w" corresponds to a variation of the percentage of the total width of the main portion 20a overlapped by the folded-over portion 20b.

Figure 13A:
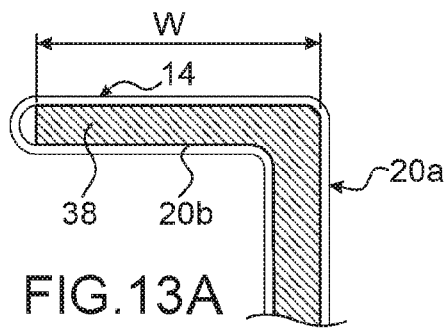
FIGS. 13A to 13C show another exemplary embodiment in which the width of the heel of the stiffener changes along the length of the stiffener.
Figure 13B:
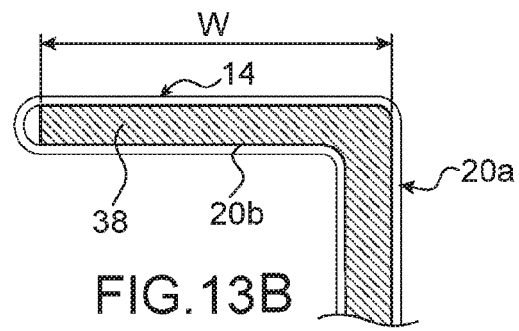
Figure 13C:
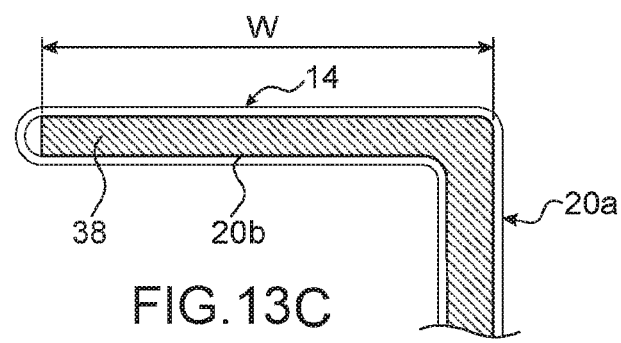

Lastly it is noted that another possibility lies in varying the width "W" of at least part of stiffener 4 along the length thereof, such as by varing the width "W" of the heel 14 thereof in the embodiment shown in FIGS. 13A to 13C.

The changing sections shown in FIGS. 11A to 14C, which, in addition, can be combined and can extend to all or part of the stiffener 4, make it possible to adapt locally the mechanical properties of the stiffener 4 depending on the specific requirements. This changing nature of the section is obtained by suitable folds, which possibly change as the same stiffener is produced. Lengths of different sections, but each having a substantially constant section, can also be fixed end-to-end so as to obtain a stiffener having a section that changes along the length of the stiffener.

To do this, another possibility, which possibly can be combined with the previous possibilities, lies in providing a sheet of variable height prior to its entry into the folding equipment with, for example, opposite edges 18' that are non-parallel, or that even are not necessarily straight, as has been shown in FIG. 15. Thus, for example, by providing a changing width of the raw sheet 18, it is possible, thanks to the enlarged portions 18", to obtain a greater number of folded-over portions.

Of course, various modifications can be made by the person skilled in the art to the disclosure herein that has just been described merely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage stiffener formed, at least in part, from a folded sheet and comprising a heel, a web, and a flange,
wherein the folded sheet comprises a main portion, in a form of an exterior surface of the stiffener, the main portion having a heel main portion extending along a length of the heel, a web main portion extending along a length of the web, and a flange main portion extending along a length of the flange, and at least one folded-over portion, in a form of an interior surface of the stiffener, the folded-over portion extending over at least part of one or more of the web, the heel, and the flange,
wherein the web main portion is a same height as a height of the stiffener;
wherein the main portion comprises a first surface and a second surface, wherein the first surface comprises the exterior surface of the stiffener, and the second surface is covered by the folded-over portion, and wherein the main portion is spaced apart from the folded-over portion in one or more of the web, the heel, and the flange, thereby delimiting at least one cavity therebetween.

2. The stiffener according to claim 1, wherein at least part of one or more of the web, the heel, and the flange has a thickness that is variable along a length of the stiffener.

3. The stiffener according to claim 2, wherein the thickness is variable by varying a spacing of the main portion and folded-over portion, by varying a number of folded-over portions overlapping one another, or by varying the spacing of the main portion and folded-over portion as well as the number of folded-over portions overlapping one another.

4. The stiffener according to claim 1, wherein the web has a height that is variable along a length of the stiffener, the heel has a width that is variable along the length of the stiffener, the flange has a width that is variable along the length of the stiffener, or any combination thereof.

5. The stiffener according to claim 1, wherein, at least at one of the web, the heel, and the flange, the main portion is doubled by the folded-over portion along an overlap width that is variable along a length of the stiffener.

6. The stiffener according to claim 1, wherein the at least one cavity is filled, at least in part, by at least one reinforcement element.

7. The stiffener according to claim 6, wherein each of the at least one reinforcement element is fixed to the main portion, the folded-over portion, or the main portion as well as the folded-over portion.

8. The stiffener according to claim 1, wherein the folded-over portion extends along at least a portion of the length of the web, with the aid of a web lining element.

9. The stiffener according to claim 8, wherein the web lining element defines, in cross section of the stiffener, a mechanical reinforcement edging, with through-openings that open out at the flange.

10. The stiffener according to claim 9, wherein the through-openings are arranged between the mechanical reinforcement edging and the flange.

11. The stiffener according to claim 9, wherein the mechanical reinforcement edging defines a cavity.

12. The stiffener according to claim 11, wherein the cavity is filled, at least in part, by a reinforcement element.

13. The stiffener according to claim 1, wherein, in cross section, the stiffener is in a shape of a C or Z, with a central branch corresponding to such a shape comprising the web and two end branches, with one of the two end branches comprising the heel and another of the two end branches comprising the flange.

14. The stiffener according to claim 13, wherein the central branch is perpendicular to the two end branches formed by the heel and the flange.

15. The stiffener according to claim 1, wherein the stiffener forms all or part of a fuselage frame or a longitudinal stringer.

16. An aircraft fuselage comprising at least one stiffener according to claim 1.

17. An aircraft comprising a fuselage according to claim 16.

18. A method for producing a stiffener according to claim 1, comprising folding the sheet to obtain a shape of the stiffener so that the folded-over portion is folded over on the main portion.

* * * * *